Nov. 30, 1937.　　　P. KOLLSMAN　　　2,100,604
INSTRUMENT MOUNTING
Filed March 5, 1935　　　2 Sheets-Sheet 1
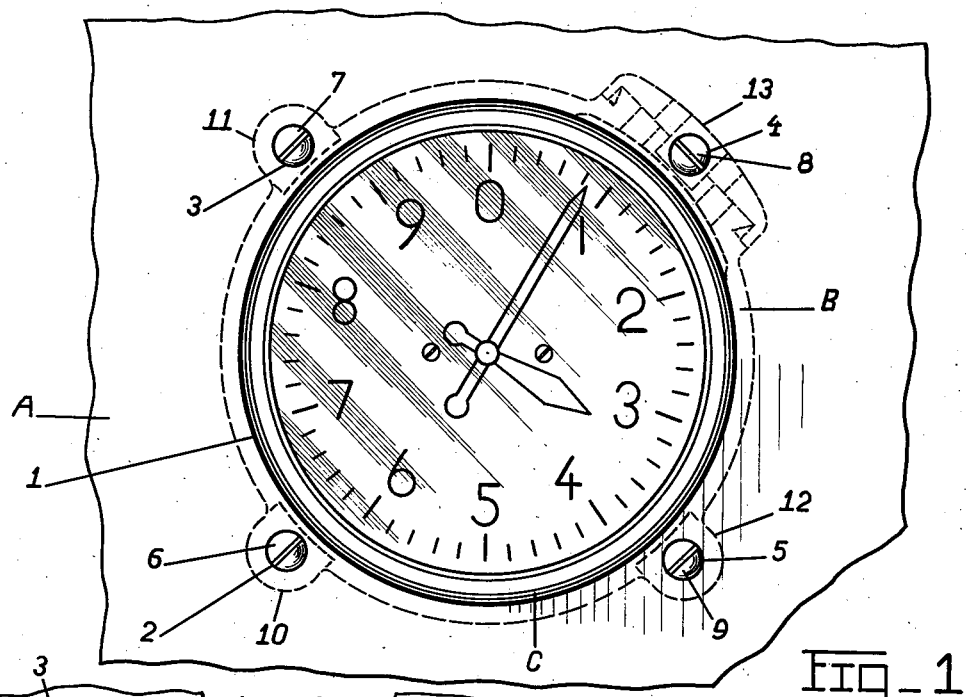
Fig. 1
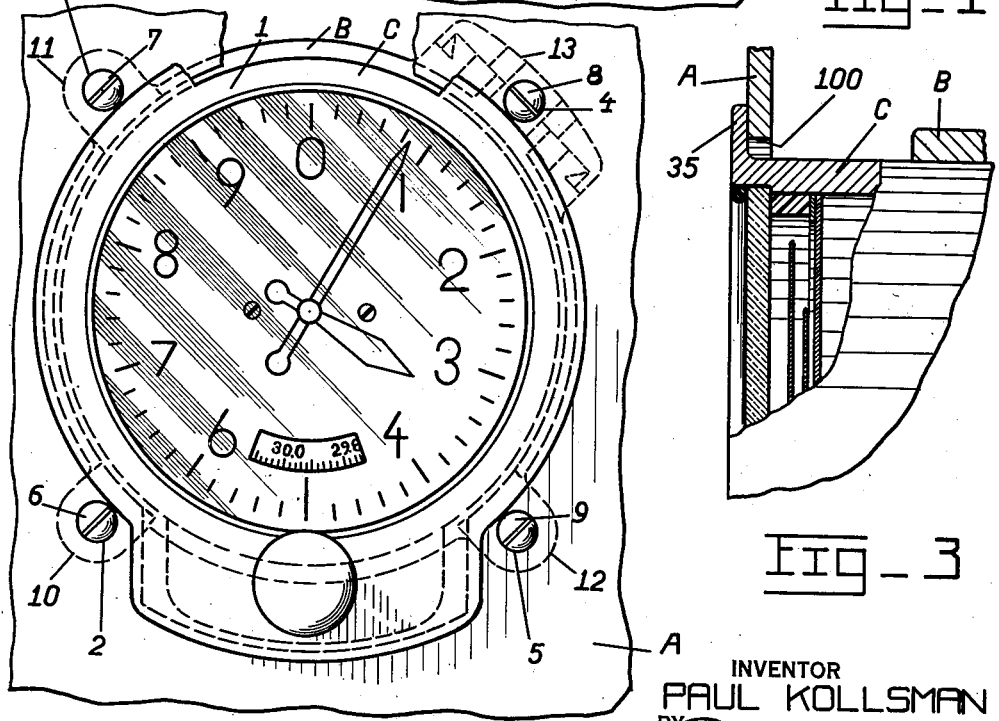
Fig. 2
Fig. 3
INVENTOR
PAUL KOLLSMAN
BY
ATTORNEY

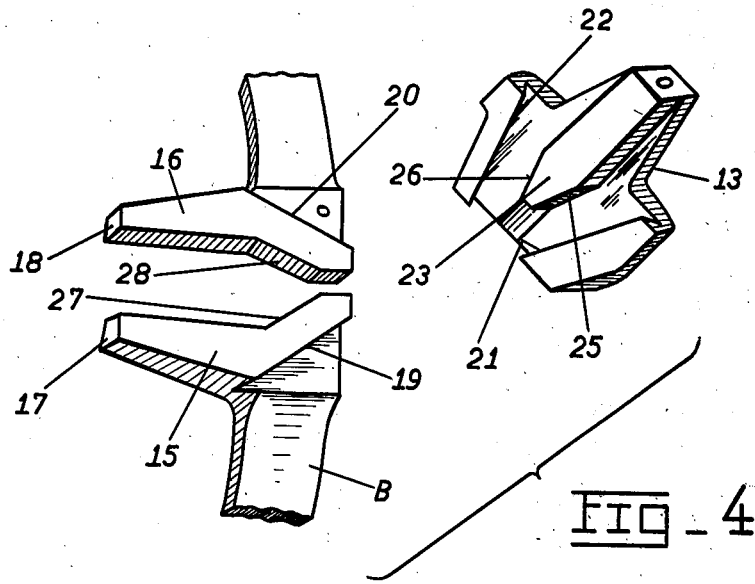
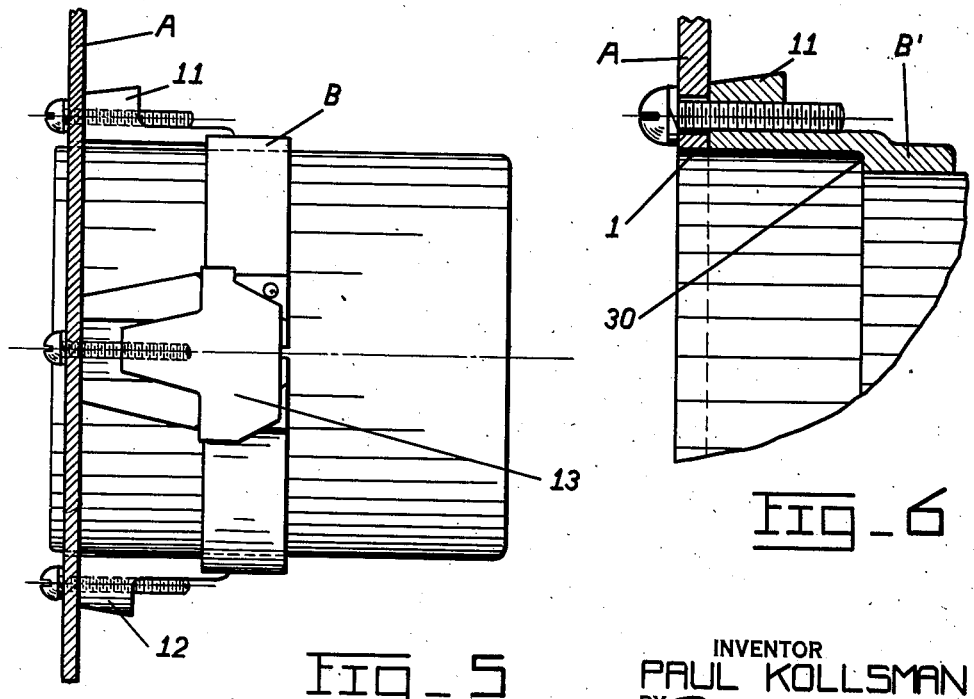

Patented Nov. 30, 1937

2,100,604

UNITED STATES PATENT OFFICE 2,100,604

INSTRUMENT MOUNTING

Paul Kollsman, New York, N. Y.

Application March 5, 1935, Serial No. 9,399

8 Claims. (Cl. 248—27)

This application is a continuation in part of my application for Instrument mounting, filed April 5, 1934, Serial No. 719,116.

This invention relates to the mounting of instrument cases upon an instrument board or panel which is provided with a cut-out to expose the indicating part of the instrument.

Examples of the type of instruments, the cases of which require mounting on an instrument board, are altimeters, speed-indicators and compasses, necessarily employed in aviation. It is particularly, although not necessarily, this art in which my invention is advantageous. Instruments require removal, replacement and even substitution by improved types of instruments, sufficiently frequently in connection with airplanes as to present actual mechanical difficulties in their manipulation. It has been the practice to provide a cut-out in the instrument board of a size and shape to fit the front rim of the instrument to be mounted and carefully to position four screw holes about the periphery of the cut-out equi-angularly disposed to cooperate with four tapped lugs formed on the case of the instrument. In assembling the instrument, its connections—electrical, pneumatic or mechanical—were first made in the rear of the instrument board and then the instrument was inserted from the rear through the cut-out and secured by the screws. Obviously, unless great care had been taken in forming the cut-out and the positioning of the screw holes, the mounting of the instrument might be improper even though a template had been employed to mark out the cut-out and the relative positioning of the screw holes. Unless the template were positioned as an entirety in the exact and proper angular position, the final mounting of the instrument partook of the same error that had been present in the positioning of the template. The enforced connection of the instrument by manipulation in the rear of the instrument board is also troublesome.

An object of my invention is to provide a gripping collar to be located in the rear of the instrument board capable of almost universal application to various types of instruments and instrument cases and one which may not only be secured in position from the front of the board by means of screws through the customary screw holes, but one which is caused to be clamped about the instrument case by the manipulation of these usual screws from the front of the board.

By reason of the broader aspects of my invention and in amplification thereof, I contemplate preferably the mounting of instrument cases by insertion from the front of the board, connections being first made at the front of the board with the parts to be connected extending from the rear through the cut-out. I also contemplate, by reason of my invention, the possibility of using rough, irregular cut-outs in the board which do not require expert skill and the more or less inaccurate angular positioning of the mounting screw holes. To this end I contemplate the advantage of employing an escutcheon plate or flange adapted to cover the lips of the irregularly formed cut-out and imparting to the front of the board never-the-less a pleasing, neat finish, while a rotary adjustment into correct position of such an instrument may be effected after it is fully connected up and while it is being clamped, in accordance with my invention, to the board.

Another objective feature of my invention is to make possible the release of the instrument casing by the clamping collar by a manipulation at the front of the panel board.

Other advantages and objective features of my invention will be apparent from the following description of the illustrative embodiments, which description is directed to the showing in the accompanying drawings. My showing of these illustrative embodiments is intended to explain and not limit the following claims which are directed to my invention.

In the accompanying drawings, Fig. 1 is a front elevation of an instrument or panel board showing an altimeter mounted in accordance with my invention;

Fig. 2 is a front elevation showing a settable altimeter mounted in accordance with my invention, in which inaccuracies in the cut-out and screw hole positioning are overcome;

Fig. 3 is a fractional vertical cross-section through the construction shown in Fig. 2 at the locality of zero on the scale;

Fig. 4 is a dissassembled perspective view with parts broken away of the terminal parts and clamping boss portions of the instrument mount;

Fig. 5 is a side elevation of an instrument mounted in accordance with my invention, the panel board being shown in section; and Fig. 6 is a detail enlarged cross-section of a modification.

Referring now more in detail to the drawings, A is an instrument board sometimes called a panel. This board is present on most carriers, such as airplanes, requiring the use of instruments. It has been customary to form therein cut-outs 1 usually circular, positioned about which are a plurality of perforations 2, 3, 4, and 5, usually four in number uniformly spaced about the cut-out. These perforations are intended to accommodate screws 6, 7, 8, and 9 for mounting an instrument. In accordance with previous practice the instruments were inserted from the rear and the screws engaged tapped lugs.

In accordance with my invention I make it convenient for the instrument to be inserted from the front through a cut-out appropriate for the cross-section of the instrument. To this end I provide an instrument mount comprising a split collar which frictionally clamps the instrument after it has been adjusted into position. By this expedient it is not necessary that the holes 2, 3, 4, and 5 or, in fact, a cut-out be made with an exceptional degree of accuracy.

Intended to be positioned in the rear of the panel is a split collar B which is provided with a plurality of bosses. In the present embodiment four are provided, one for each of the securing screws. In the drawings they are indicated as 10, 11, 12, and 13. These bosses are tapped to cooperate with the screws.

All the bosses except 13 extend against the inside face of the panel board A to position the collar B, but the boss 13 extends short of the panel A and is a manipulating clamping and releasing member. To take the place of the positioning function at the locality of the boss 13, the terminal parts 15 and 16 of the split collar B have feet 17 and 18 intended to rest against the inside of the panel board to resist a movement of the boss 13 towards the panel board in clamping the collar.

The terminal parts have undercut inclined faces 19 and 20 which cooperate with complimentary faces 21 and 22 on the boss 13 for the clamping of the collar B. In addition, the boss 13 has a plug portion 23 provided with wedging faces 25 and 26 cooperating with inclined faces 27 and 28 on the terminal portions 15 and 16. The plug 23 is capable of functioning on the urge of a screw driver on the screw 8 to force open the split collar in the event an instrument case is to be removed and it sticks to the clamping collar.

Referring particularly to Fig. 6, there are some cases in which it is desired that the collar portion proper have a smaller diameter than the cut-out and particularly so that a shoulder 30 may be provided to fix the inner movement or position of an instrument case. Such a collar B' is illustrated in this figure. Otherwise, the construction is to be understood as the same as that described.

In Figs. 2 and 3 the instrument case C is shown provided with a flange 35 which permits the cut-out indicated as 100 to be somewhat irregular, while at the same time the cut-out is closed at the front and a pleasing appearance is effected.

What I claim and desire to secure by United States Letters Patent is:

1. In a device for mounting an instrument upon an instrument board which is provided with a cut-out to expose the instrument, a split collar for embracing the instrument and adapted to be mounted about said cut-out on the rear of said instrument board, and means wholly external to the space embraced by said collar and operable from the front of said instrument board for positively forcing the terminal ends of said split collar both towards each other to clamp the instrument and away from each other to release the instrument.

2. In a device for mounting an instrument upon an instrument board which is provided with a cut-out to expose the instrument, a split collar for embracing the instrument and adapted to be mounted about said cut-out on the rear of said instrument board, and means operable from the front of said instrument board for positively forcing the terminal ends of said split collar both towards each other to clamp the instrument and away from each other to release the instrument, said means operable from the front of the instrument board comprising screw means passing through the instrument board, a double acting wedge block engaged by said screw means and double-faced terminal portions at the ends of said split collar.

3. In combination, an instrument board having a cut-out; an instrument case to be mounted in the rear of said cut-out; a clamping collar in the rear of said board and substantially parallel therewith; one or more bosses spacing said clamping collar rearwardly from said board securing it thereto for the support of an instrument and simultaneously permitting free expansion and contraction in a plane at right angles to the axis of said instrument case, whereby uniform peripheral pressures and movements are obtained, thereby permitting substantially uniform contractability and expansibility within the range of clamping and unclamping said instrument; and screw means operable from the front of said board, including a wedge block and a resistance foot for clamping the terminal ends of said collar together without changing its spaced position in the rear of said board.

4. A clamping instrument mount comprising a split collar; said collar having a plurality of tapped bosses and cooperating screws adapted to pass from the front through an instrument board; one of said bosses being movable relatively to said collar and serving to contract said collar in response to a tightening of its screw from the front of the instrument board.

5. An instrument mounting collar for instrument boards adapted to accommodate a plurality of mounting screws positioned about an instrument cut-out, comprising a split collar having terminal parts and tapped bosses functioning positively to space said collar from an instrument board while preserving substantially uniform contractability for said collar and adapted to cooperate with said screws, one of which is movable transversely to said collar at the locality of said terminal parts; said terminal parts and said movable boss having complementary inclined faces whereby a transverse movement of said movable boss in response to the operation of its screw causes a change in the grasp of said collar.

6. The structure as defined in claim 5 and further characterized by the fact that a reverse operation of a screw is capable of positively expanding said split collar through the operation of the movable boss.

7. In combination, an instrument board having an instrument cut-out and a plurality of mounting screw perforations distributed about the periphery of said cut-out; an instrument case capable of being inserted from the front of said board through said cut-out into operative position and being provided with an escutcheon flange for spanning the edges of said cut-out; a mounting collar in the rear of said board of a size to pass said instrument case from the front; a plurality of tapped bosses forming a part of said collar and cooperating with clamping screws passing through perforations from the front of said board, one of said bosses being movable relatively to said collar and forwardly towards said board; and said collar and said movable boss having cooperative inclined portions whereby the forward movement of said movable boss clamps said collar about said instrument case.

8. An instrument mounting split collar for instrument boards adapted to accommodate a plurality of mounting screws positioned as is normal about an instrument cutout in an instrument board, comprising a split collar having tapped bosses adapted to cooperate with the ordinary mounting screws for an instrument and one of said bosses being positively movable by its screw both towards and away from said instrument board, and thereby movable relatively to said collar; terminal parts for said collar at the locality of said movable boss, said terminal parts and said boss having complementary inclined faces both in male and female configuration positively to wedge clamp said collar together and positively to wedge said collar open and permitting said boss through its wedging engagement with said terminal parts to hold said collar to said instrument board when in clamping adjustment.

PAUL KOLLSMAN.